(12) United States Patent
Heithoff

(10) Patent No.: US 6,962,887 B2
(45) Date of Patent: Nov. 8, 2005

(54) TRANSPARENT GLASS HAVING BLUE EDGE COLOR

(75) Inventor: Robert B. Heithoff, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 107 days.

(21) Appl. No.: 10/438,134

(22) Filed: May 14, 2003

(65) Prior Publication Data

US 2004/0229744 A1 Nov. 18, 2004

(51) Int. Cl.$^7$ .............................................. C03B 18/02
(52) U.S. Cl. ........................... 501/64; 501/70; 501/71; 65/99.2
(58) Field of Search ............................. 501/64, 70, 71; 65/99.2

(56) References Cited

U.S. PATENT DOCUMENTS

| | | | |
|---|---|---|---|
| 4,792,536 A | 12/1988 | Pecoraro et al. | 501/70 |
| 5,030,594 A | 7/1991 | Heithoff | 501/72 |
| 6,218,323 B1 * | 4/2001 | Bretschneider et al. | 501/71 |
| 6,258,740 B1 * | 7/2001 | Machishita et al. | 501/70 |
| 6,548,434 B2 * | 4/2003 | Nagashima | 501/70 |
| 2003/0125188 A1 * | 7/2003 | Koyama et al. | 501/70 |
| 2004/0043886 A1 * | 3/2004 | Akada et al. | 501/64 |

FOREIGN PATENT DOCUMENTS

| | | | | |
|---|---|---|---|---|
| EP | 976691 A | * | 2/2000 | |
| JP | 11060269 A | * | 3/1999 | ............ C03C/4/08 |
| WO | WO 01/64595 A | * | 9/2001 | |

* cited by examiner

*Primary Examiner*—David Sample
(74) *Attorney, Agent, or Firm*—Jacques B. Miles

(57) ABSTRACT

A method is provided for making clear glass having an azure edge coloration and low amber surface coloration in a non-vacuum float glass system. The method includes processing batch materials in a non-vacuum float glass system to provide a final glass product including:

| | |
|---|---|
| $SiO_2$ | 65–75 wt. %; |
| $Na_2O$ | 10–20 wt. %; |
| CaO | 5–15 wt. %; |
| MgO | 0–5 wt. %; |
| $Al_2O_3$ | 0–5 wt. %; |
| $K_2O$ | 0–5 wt. %; | a colorant portion having total iron ($Fe_2O_3$) of 0–0.02 wt. %, CoO of 0–5 ppm, $Nd_2O_3$ of 0–0.1 wt. %, and CuO of 0–0.03 wt. %. The glass has a redox ratio in the range of 0.2 to 0.6, and can have a retained sulfur content of less than or equal to 0.2 wt. %, such as less than or equal to 0.11 wt. %.

32 Claims, 2 Drawing Sheets

TRANSPARENT GLASS HAVING BLUE EDGE COLOR

BACKGROUND OF THE INVENTION

1. Field of the Invention

This invention relates generally to glass compositions and glass articles and, more particularly, to methods of making highly transparent glass having an aesthetically pleasing blue edge coloration using conventional float glass systems and to the resultant glass articles.

2. Technical Considerations

U.S. Pat. No. 5,030,594 discloses an aesthetically pleasing glass composition useful, for example, in furniture applications such as tabletops or shelving. This glass is highly transparent when viewed normal to a major surface of the glass but has an aesthetically desirable blue (i.e., azure) edge color when viewed on edge. This known glass composition can be made in a multi-stage melting and vacuum-assisted refining operation as disclosed in U.S. Pat. No. 4,792,536. The refining stage of this known process is performed under a vacuum to reduce the concentration of dissolved gasses and volatile gaseous components, particularly sulfur-containing components. As will be appreciated by one skilled in the art, it can be advantageous to remove sulfur-containing components from certain float glass compositions since the combination of sulfur with iron in the glass can result in amber coloration of the glass at high redox ratios, for example, iron redox ratios above 0.4, especially above 0.5, due to the formation of ferric sulfide (also conventionally referred to as iron sulfide or iron polysulfide). Ferric sulfide can form throughout the bulk glass or in streaks or layers of a glass sheet. As used herein, the term "bulk glass" means the internal portion of a glass piece, such as a glass sheet, that is not chemically altered in the process of forming the glass. For a 2 mm or thicker glass sheet made by a float glass process, the bulk glass does not include the outer region of the glass adjacent the glass surface, for example the outer 25 microns (as measured from the glass surface). The elimination of gaseous sulfur components in the vacuum refining stage of this known process helps prevent the formation of ferric sulfide in the glass and, thus, helps prevent amber coloration.

The glass disclosed in U.S. Pat. No. 5,030,594 has received favorable acceptance in the glass market due at least in part to its high visible light transmittance coupled with its aesthetically pleasing blue edge color. Glass made by the process of U.S. Pat. No. 4,792,536 is also characterized by its uniformity of color through the thickness of a glass sheet due to the absence of amber surfaces. While glass manufacturers may wish to produce glass similar to that disclosed in U.S. Pat. No. 5,030,594, most conventional glass manufacturers do not have access to the multi-stage, vacuum-assisted glass manufacturing system currently used to produce this glass. Most commercial flat glass manufactured today is made using conventional non-vacuum float glass processes which lack the specialized vacuum stage used in U.S. Pat. No. 4,792,536. Moreover, it would not be economically feasible to modify a conventional float glass system to add such a vacuum stage since the costs involved would likely be much larger than the financial return obtained in making this specialized blue edge colored glass.

In a float glass process, molten glass flows from a furnace onto a pool of molten tin in a float bath to form a float glass ribbon. During the float process, oxygen from the bottom surface of the float glass ribbon, i.e., the surface of the ribbon in contact with the molten tin, can diffuse into the molten tin. Consequently, multivalent ions at the bottom surface of the glass can become chemically reduced. For example, sulfur in or near the bottom surface of the glass can be reduced from $S^{+6}$ (hexavalent sulfur) to $S^{-2}$ (sulfide). These sulfides can react with iron, particularly ferric iron ($Fe^{+3}$), to form iron polysulfides at the bottom surface of the glass ribbon. The iron can already be present in the glass or, in some instances, iron present in the molten tin can diffuse into the bottom surface of the glass to react with the sulfides. Iron polysulfide is a powerful colorant and can produce a region or layer of amber color several microns thick on the bottom of the glass ribbon. Thus, if one were to look through the edge of the resultant glass sheet at an oblique angle, the region of amber coloration on the bottom of the glass can make blue glass appear green or yellowish-green. This perceived color shift of the glass edge at oblique viewing angles is not aesthetically desirable for most applications. The undesirable effect of amber coloration on the bottom surface of the glass can also be present in other tinted glass, such as those having a bulk glass color of green or bluish green.

Therefore, it would be advantageous to provide a method of making glass having similar color characteristics to the glass in U.S. Pat. No. 5,030,594 but using a conventional non-vacuum glass manufacturing process and which reduces or eliminates this greenish edge appearance at oblique viewing angles.

SUMMARY OF THE INVENTION

A method is provided for making clear glass having an azure edge coloration and low amber surface coloration in a non-vacuum float glass system. The method comprises providing a non-vacuum float glass system having a melter and a molten metal bath, and melting batch materials to provide a final glass product comprising:

| | |
|---|---|
| $SiO_2$ | 65–75 wt. %; |
| $Na_2O$ | 10–20 wt. %; |
| CaO | 5–15 wt. %; |
| MgO | 0–5 wt. %; |
| $Al_2O_3$ | 0–5 wt. %; |
| $K_2O$ | 0–5 wt. %; | and a colorant portion comprising:

| | |
|---|---|
| total iron ($Fe_2O_3$) | 0–0.02 wt. %; |
| CoO | 0–5 ppm; |
| $Nd_2O_3$ | 0–0.1 wt. %; and |
| CuO | 0–0.03 wt. %. |

The glass can have a redox ratio in the range of 0.3 to 0.6. In one embodiment, the glass includes less than or equal to 0.11 wt. % $SO_3$. In a further embodiment, the glass includes 0 to 0.2 wt. % $CeO_2$ and has less than or equal to 0.2 wt. % $SO_3$. The method can include treating the molten metal in the molten metal bath to remove dissolved iron such that the dissolved iron remaining in the molten metal is less than or equal to 0.05 wt. %.

Clear glass is provided having an azure edge coloration and low amber surface coloration made in a non-vacuum float glass system. The glass comprises:

| | |
|---|---|
| $SiO_2$ | 65–75 wt. %; |
| $Na_2O$ | 10–20 wt. %; |
| CaO | 5–15 wt. %; |
| MgO | 0–5 wt. %; |
| $Al_2O_3$ | 0–5 wt. %; |
| $K_2O$ | 0–5 wt. %; | and
a colorant portion comprising:

| | |
|---|---|
| total iron ($Fe_2O_3$) | 0.007 wt. % to 0.02 wt. %; |
| CoO | 0–5 ppm; |
| $Nd_2O_3$ | 0–0.1 wt. %; |
| CuO | 0–0.03 wt. %. |

The glass can have a redox ratio in the range of 0.3 to 0.6 and/or a retained sulfur content of less than or equal to 0.2 wt. % $SO_3$, such as less than or equal to 0.11 wt. % $SO_{o3}$. The glass can include 0 to 0.2 wt. % $CeO_2$.

DESCRIPTION OF THE PREFERRED EMBODIMENTS

Figure 1:
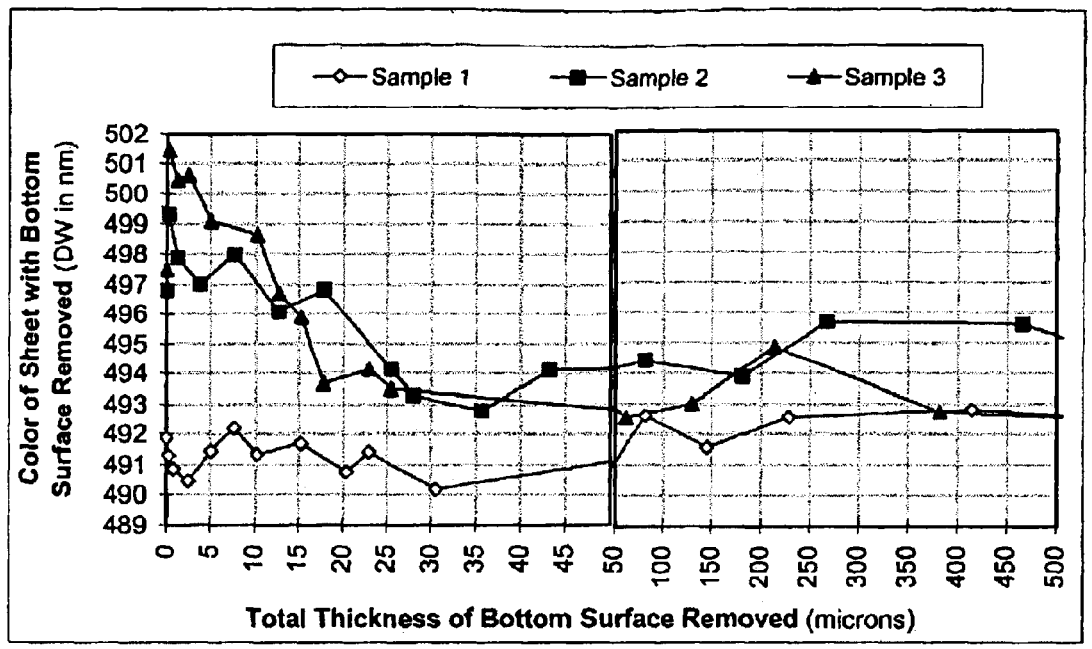
FIG. 1 is a graph of transmitted color (dominant wavelength) of a float glass sheet versus amount of bottom surface removed for several commercially available highly transparent glass sheets.

As used herein, spatial or directional terms, such as "top", "bottom", and the like, relate to the invention as it is shown in the drawing figures. However, it is to be understood that the invention can assume various alternative orientations and, accordingly, such terms are not to be considered as limiting. Unless otherwise indicated, all numbers expressing dimensions, physical characteristics, quantities of ingredients, reaction conditions, and so forth used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to include the beginning and ending range values and to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. Additionally, all documents, such as but not limited to issued patents and patent applications, referred to herein are to be considered to be "incorporated by reference" in their entirety. Any reference to composition amounts, unless otherwise specified, is "by weight percent" based on the total weight of the final glass composition. The "total iron" content of the glass compositions disclosed herein is expressed in terms of $Fe_2O_3$ in accordance with standard analytical practice, regardless of the form actually present. Likewise, the amount of iron in the ferrous state is reported as FeO, even though it may not actually be present in the glass as FeO. The terms "redox ratio" or "iron redox ratio" mean the amount of iron in the ferrous state (expressed as FeO) divided by the amount of total iron (expressed as $Fe_2O_3$). The "sulfur" content of the glass compositions disclosed herein is expressed in terms of $SO_3$ in accordance with standard analytical practice, regardless of the form actually present. As used herein, "visible transmittance" and "dominant wavelength" values are those determined using the conventional CIE Illuminant C and 2-degree observer angle. Those skilled in the art will understand that properties such as visible transmittance and dominant wavelength can be calculated at an equivalent standard thickness, e.g., 5.5 mm, even though the actual thickness of a measured glass sample is different than the standard thickness.

The present invention provides an aesthetically desirable glass that is high in visible light transmittance in a normal (i.e. perpendicular) direction to a sheet of the glass but has an aesthetically pleasing blue or azure edge color when viewed on edge. By "high visible light transmittance" is meant visible light transmittance greater than or equal to 85%, such as greater than or equal to 87%, such as greater than or equal to 90%, such as greater than or equal to 91%, such as greater than or equal to 92%, at 5.5 mm equivalent thickness for glass from 2 mm to 25 mm sheet thickness. By "visible light" is meant electromagnetic radiation having a wavelength in the range of 380 nanometers (nm) to 770 nm. By "blue edge color" or "azure edge color" glass is meant having a dominant wavelength in the range of 480 nanometers (nm) to 510 nm, such as in the range of 485 nm to 505 nm, such as in the range of 486 nm to 500 nm, such as in the range of 487 nm to 497 nm, when viewed on edge at an equivalent thickness of 5.5 mm. The glass can be made using a conventional non-vacuum float glass system. By "conventional" or "non-vacuum" float glass system is meant that the molten glass is not subjected to a vacuum stage such as that in U.S. Pat. No. 5,030,594 during the glass melting or refining operations. In one embodiment, the glass can be essentially free of sulfur. By "essentially free of sulfur" is meant that no intentional addition of sulfur-containing compounds is made to the glass composition. However, trace amounts of sulfur can be present in the glass due to impurities in the batch materials or other sources, including cullet. By "trace amounts of sulfur" is meant sulfur in the range of greater than 0 wt. % to 0.03 wt. %. In another embodiment, sulfur-containing materials, such as sulfur-containing refining aids, can be intentionally added to the glass composition, e.g., to improve the melting characteristics of the glass batch materials. However, in this embodiment, if such sulfur-containing materials are intentionally added, they can be added such that the retained sulfur content (e.g., the average amount of $SO_3$ left in the resultant bulk glass) is less than or equal to 0.2 wt. %, such as less than or equal to 0.15 wt. %, such as less than 0.11 wt. %, such as less than or equal to 0.1 wt. %, such as less than or equal to 0.08 wt. %, such as less than or equal to 0.05 wt. %. In one embodiment, the residual sulfur can be in the range of 0.005 wt. % to 0.2 wt. %.

Non-limiting examples of conventional non-vacuum float glass systems are disclosed in U.S. Patent Nos. 4,354,866; 4,466,562; and 4,671,155. As will be appreciated by one of ordinary skill in the glass making art, conventional float glass systems typically include a furnace or melter into which the glass batch materials can be placed for melting. In one practice of the invention, the melter can be an oxyfuel furnace in which the fuel is mixed with oxygen to supply heat to melt the batch materials. In another practice of the invention, the melter can be a conventional air-fuel melter in which air is mixed with the combustion fuel to provide heat to melt the batch materials. In a still further practice of the invention, the melter can be a hybrid-type melter in which a conventional air-type melter is augmented with oxygen lances to supplement the heated air with oxygen before combustion.

The molten glass from the furnace can flow into a conventional float chamber having a pool of molten metal. The float-chamber is typically sealed and purged with a forming gas mixture, typically nitrogen with up to ten volume percent hydrogen. The molten metal is typically molten tin. The molten glass spreads over the surface of the molten tin and is controllably cooled to form a float glass ribbon. The float glass ribbon exits the float chamber and can be further heat treated, such as by annealing. The structure and operation of a conventional float glass system will be well understood by one of ordinary skill in the art and, hence, will not be described in detail herein.

An exemplary method of forming glass in accordance with the invention utilizing a conventional non-vacuum float glass system will now be described. Glass batch materials are introduced into the melter. Typical batch materials for a soda-lime-silica glass composition include sand, soda ash, limestone, and dolomite. As will be appreciated by one skilled in the art, conventional soda-lime-silica batch materials also include melting and refining aids, such as salt cake (sodium sulfate). Salt cake can also be an oxidizer when incorporated into the glass batch. As discussed above, the presence of sulfur with iron can lead to amber or yellowish coloration on the bottom surface of the float glass ribbon due to the local formation of iron polysulfides at or near the bottom surface of the glass. Therefore, in one aspect of the invention, to reduce retained sulfate and subsequent coloration from iron polysulfide, no sulfur-containing melting and refining aid materials, e.g., salt cake, are intentionally added to the glass batch materials. Due to the absence of the salt cake, melting the batch materials can be more difficult than would be with the salt cake. Therefore, to offset the absence of salt cake, the temperature in the melter can be increased and/or the throughput of the melter can be decreased to provide sufficient melting of the batch materials. The batch materials can be selected to provide a final glass product having the following composition:

| Material | Weight Percent |
| --- | --- |
| $SiO_2$ | 65–75 |
| $Na_2O$ | 10–20 |
| CaO | 5–15 |

-continued

| Material | Weight Percent |
| --- | --- |
| MgO | 0–5 |
| $Al_2O_3$ | 0–5 |
| $K_2O$ | 0–5 |

To provide the azure edge color, a colorant portion can be added to the batch materials. In one embodiment, the colorant portion can include one or more iron-containing compounds with the total iron (expressed as $Fe_2O_3$) being less than 0.02 wt. %, such as in the range of 0.007 to 0.02 wt. %. Additional or alternative colorants can include one or more of cobalt oxide (as CoO) such as in the range of 0 ppm to 5 ppm, neodymium oxide (as $Nd_2O_3$) in the range of 0 wt. % to 0.1 wt. %, and/or copper oxide (as CuO) in the range of 0 wt. % to 0.03 wt. %. The redox ratio of the glass can be controlled to be within the range of 0.3 to 0.6, such as 0.4 to 0.5, such as about 0.5. In one embodiment of the invention, the glass batch materials can be essentially free of sulfur, i.e., no intentional addition of sulfur-containing materials is made to the batch materials. However, as will be appreciated by one skilled in the art, sulfur could be present from other sources, such as impurities in the batch materials and/or cullet.

If salt cake is totally eliminated from the batch materials, in addition to increased melting difficulties, the redox ratio of the glass can increase to the point where polysulfides can be formed in the bulk glass, thus providing the bulk glass with an amber tint. In order to control the redox ratio of the glass, non-sulfur containing oxidizers can be added to the batch materials in place of salt cake. One non-limiting example of such a material is sodium nitrate ($NaNo_3$). While sodium nitrate can prevent the redox ratio of the glass from increasing to the point where bulk polysulfide formation results in an undesirable amber tint in the bulk glass, sodium nitrate can lead to the production of $NO_x$ emissions during the glass production process. These $NO_x$ emissions may have to be treated in conventional manner before release of the melter gasses to the atmosphere to meet governmental restrictions on $NO_x$ emissions.

In a further embodiment, cerium oxide ($CeO_2$) can be added to the batch materials to control the redox. Cerium oxide can be very effective even at concentrations in the range of greater than 0 wt. % to 0.2 wt. %, such a less than or equal to 0.1 wt. %. One result of the use of cerium oxide is that it can cause surface fluorescence when the glass is exposed to ultraviolet light, such as that present in normal sunlight.

In a still further embodiment of the invention, rather than completely eliminating salt cake from the batch materials, a mixture of salt cake and one or more non-sulfur containing oxidizing materials, such as but not limited to sodium nitrate and/or cerium oxide, can be added to the batch materials to aid in melting and refining the batch materials. If salt cake is present, the initial introduction of non-sulfur-containing oxidizing materials can result in increased retention of sulfate but ultimately the amount of salt cake added to the batch materials can be controlled to provide a final glass product that is substantially free of sulfur. By "substantially free of sulfur" is meant that residual sulfur (i.e., $SO_3$) in the bulk glass is less than or equal to 0.2 wt. %, such as less than or equal to 0.15 wt. %, such as less than or equal to 0.11 wt. %, such as less than or equal to 0.1 wt. %, such as less than or equal to 0.08 wt. %, such as less than or equal to 0.05 wt.

%. The utilization of both salt cake and non-sulfur containing oxidizing agents can maintain the melting and refining conditions of the glass batch materials and redox ratio of the glass without leading to or promoting the undesirable formation of polysulfides at the region adjacent the bottom of the glass.

In a still further embodiment of the invention, the melter can be an oxyfuel furnace. It has been observed that for batch materials having a given level of salt cake, the retained sulfate in the resultant glass when the batch materials are melted using an oxyfuel furnace is less than that retained for the same glass batch composition using a conventional air furnace. Thus, salt cake or another sulfur-containing oxidizer can be added to the batch materials and melted in an oxyfuel furnace to provide lower retained sulfate than would be present if the same batch composition were melted in a conventional air-fuel furnace. In this embodiment, the sulfur-containing batch material should be added at a level to provide a glass product that is substantially free of sulfur.

In a still further embodiment, a conventional air-fuel furnace can be modified by introducing oxygen conduits or lances into the furnace to mix oxygen with the combustion air of the furnace to increase the oxygen content of the combustion air over that of the air-fuel furnace without the oxygen conduit. The introduction of extra oxygen into the combustion air is believed to decrease the retained sulfur level in the resultant glass.

Thus, as discussed above, the formation of undesirable amber coloration in the glass can be reduced or eliminated by adjusting and/or selecting the components of the glass composition. However, in another aspect of the invention, this undesirable amber coloration can be affected by additionally or alternatively controlling the amount of dissolved iron in the molten metal of the molten metal bath.

As will be appreciated by one of ordinary skill in the glass making art, clear and ultra-clear float glass is particularly susceptible to an iridescent bloom formation on the bottom surface. During the float glass forming process, tin oxide (SnO) from the tin bath can diffuse into the bottom surface of the float glass ribbon. When the resultant glass is reheated in the presence of oxygen, e.g., air, such as during bending, tempering, or sagging operations, highly concentrated tin oxide (SnO) on the bottom surface of the glass can oxidize to form tin dioxide ($SnO_2$). The subsequent microscopic volume expansion can cause the appearance of an iridescent haze on the glass. U.S. Pat. No. 3,305,337 teaches adding certain reactive elements, including iron, to the tin bath can capture oxygen, thus reducing the migration of tin oxide into the bottom of the glass and, therefore, the potential for bloom formation. Under equilibrium conditions, a given concentration of iron in the molten tin will be reached as a function of the concentration of iron in the glass. For example, while producing a clear float glass with a concentration of 0.1 wt. % iron oxide, the equilibrium concentration of iron in the molten tin bath can be about 0.01 wt. % Fe. If the concentration of iron in the tin is increased to 0.04 wt. % by a deliberate addition of iron to reduce the potential for bloom formation, increased diffusion of iron from the tin bath into the bottom surface of the glass can raise the average concentration of iron in the bottom surface of the glass to about 0.2 wt. % iron oxide. This additional iron in the bottom surface of the glass can react with sulfur (particularly sulfides $S^{-2}$) to form iron polysulfides to produce an amber color center. The intensity of the resultant color center varies as the product of the ferric ion and sulfide sulfur concentrations, $[Fe^{+3}] \cdot [S^{-2}]$. Therefore, in one aspect of the present invention, in order to decrease the formation of the iron polysulfide color centers at the bottom surface of the glass, the molten tin is substantially free of iron. By "substantially free of iron" is meant that no or substantially no iron is intentionally added to the molten tin. In one embodiment, the concentration of iron ($Fe^{+3}$) in the molten tin is less than or equal to 0.05 wt. %, such as less than or equal to 0.04 wt. %, such as less than or equal to 0.03 wt. %, such as less than or equal to 0.02 wt. %, such as less than or equal to 0.01 wt. % based on the total weight of the molten metal. Therefore, in one aspect of the invention, no iron is intentionally added to the molten tin, e.g., for two or more months prior to or during production of the glass of the invention.

As will be appreciated by one skilled in the art, even though no iron may be intentionally added to the molten tin, iron concentrations greater than those desired above could still be present in the molten tin as a consequence of the previous production of glass having a higher iron content than the desired ranges disclosed above. Therefore, in another aspect of the invention, the molten tin can be treated, e.g., cleaned, to remove dissolved iron. This treatment can be done, for example, either in situ or by temporarily removing the tin from the bath, treating the tin so that the concentration of dissolved iron in the tin is at or lower than the estimated equilibrium concentration of iron that would result from the production of glass compositions of the present invention, and then returning the cleaned tin to the bath. This cleaning can be done, for example, during the transition period for shifting from the production of one type of glass to the glass of the present invention. Typically, such a transition could take several days. By natural diffusion of iron to the continuous float glass ribbon, the period to reach the equilibrium concentration could take two to three months or longer.

The general concepts of the invention will be further described with reference to the following Examples. However, it is to be understood that the following Examples are merely illustrative of the general\concepts of the invention and are not intended to be limiting.

EXAMPLE 1

This example illustrates the yellow color center formed on the bottom surface of glass made using conventional non-vacuum assisted float glass processes. One of the aims of the present invention is to reduce or eliminate this yellow color center.

FIG. 1 shows a graph of transmitted color (in terms of dominant wavelength) of a float glass sheet versus the amount of bottom surface removed for three commercially available highly transparent glass pieces. Sample 1 is STARPHIRE® glass commercially available from PPG Industries, Inc. Sample 2 is OPTIWHITE® glass commercially available from Flachglas. Sample 3 is DIAMANT® glass commercially available from St. Gobain. All three samples are ultra-clear glass known generally as "water white glass".

The STARPHIRE® glass (Sample 1) was used as a reference since this glass was made using the vacuum-assisted glass manufacturing process disclosed in U.S. Pat. No. 5,030,594. As described in the Background section, this vacuum-assisted process leads to glass having little or no sulfur or sulfides in the bottom portion of the glass. Alternatively, both the OPTIWHITE® glass and DIAMANT® glass were made using a conventional float glass process and have higher sulfur contents. Several properties of the commercial glass used in this Example are shown in table I below.

TABLE I

|   | STARPHIRE ® | OPTIWHITE ® | DIAMANT ® |
|---|---|---|---|
| Thickness inches | 0.495 | 0.472 | 0.474 |
| (cm) | (1.26) | (1.20) | (1.20) |
| $SiO_2$ | 73.72 | 72.59 | 71.22 |
| $Na_2O$ | 14.42 | 12.87 | 13.88 |
| $K_2O$ | 0.013 | 0.454 | 0.016 |
| CaO | 10.29 | 8.81 | 9.67 |
| MgO | 0.08 | 4.32 | 4.15 |
| $Al_2O_3$ | 1.24 | 0.63 | 0.60 |
| bulk sulfur ($SO_3$) | 0.002 | 0.237 | 0.402 |
| total bulk iron ($Fe_2O_3$) | 0.010 | 0.015 | 0.010 |
| iron redox ratio | 0.57 | 0.40 | 0.50 |
| bottom surface iron ($Fe_2O_3$) | 0.124 | 0.045 | 0.027 |
| [bulk sulfur] * [bottom surface iron] | 0.0002 | 0.011 | 0.011 |

As shown in FIG. 1, the STARPHIRE® glass (Sample 1) showed very little change in color as the bottom surface was removed. The lack of color change indicates the absence of iron polysulfide color centers in the layer of glass removed. However, for Samples 2 and 3 (made using a conventional float process), the transmitted color of the sheet became more blue (lower dominant wavelength) as about 25 microns was removed from the bottom surface, indicating the presence of iron polysulfides in the removed glass. Further glass removal showed little additional change in the transmitted color.

EXAMPLE 2

This Example compares the absorption curve for glass material removed from the bottom surface of a conventional glass sheet with the known absorption curve for iron polysulfide.

Figure 2:
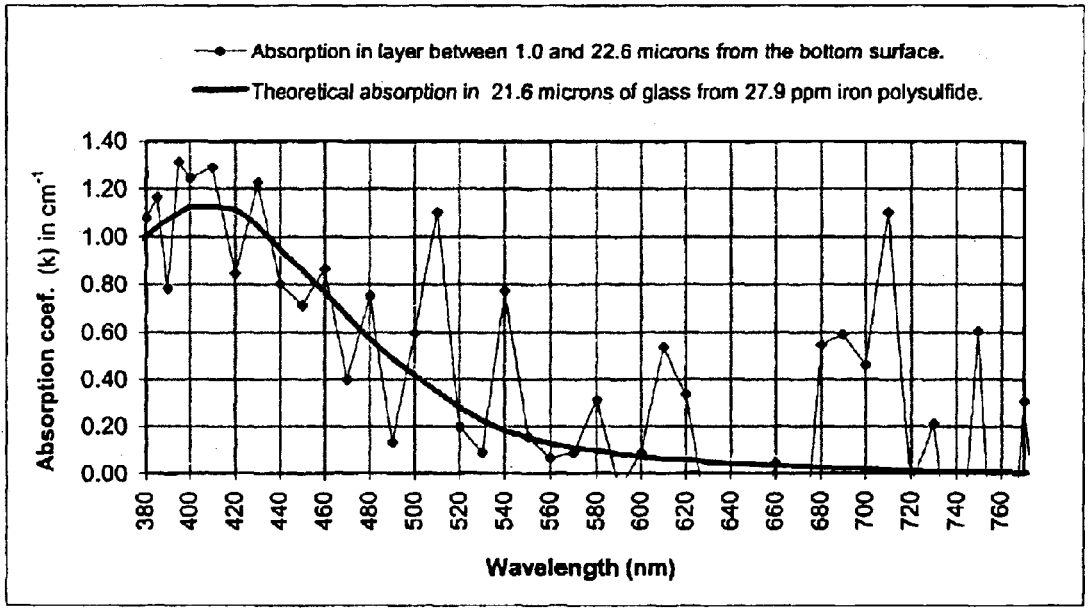
FIG. 2 is a graph comparing the absorption of a layer of glass near the bottom surface of a conventionally made highly transparent glass with the known absorption of iron polysulfide.

FIG. 2 is a graph comparing the known absorption curve for iron polysulfide with the absorption of a layer of glass removed from the bottom surface (i.e. between 1.0 and 22.6 microns from the bottom surface) of Sample 3 (DIAMANT® glass commercially available from St. Gobain) from Example 1. Since the concentration of tin oxide on float glass can be greater than 30 wt. % on the extreme bottom surface and can affect the optical properties, the first measurement without any glass removed was ignored. Also plotted in FIG. 2 is the theoretical absorption for 27.9 ppm of iron polysulfide for an equivalent thickness of 21.6 microns of glass. The theoretical absorption was calculated using a conventional spreadsheet macro program to perform curve matching for colorant absorption. The very good agreement for the two curves, particularly in the region of peak absorption of iron polysulfide, e.g., 410 nm, indicates that the yellow color center in the bottom surface of the glass was iron polysulfide. As described in the Background section, the product of the concentrations of bulk sulfur and bottom surface iron is an indication of the potential to form iron polysulfides. The corresponding values for Samples 1 to 3 in Table 1 correlate well to the relative change in color for each glass in FIG. 1. That is, even though Sample 1 had a greater concentration of iron on the bottom surface, the very low sulfur concentration in Sample 1 results in a [bulk sulfur]×[bottom surface iron] value about 1/50 that of Samples 2 and 3. Thus, it is apparent that iron polysulfides were formed in the bottom layer of the conventional float glass samples (Samples 2 and 3), which impacted upon the transmitted and/or perceived edge color of the resultant glass.

EXAMPLE 3

This Example illustrates the effect of dissolved iron in the molten tin of a conventional float system on the transmitted color of the resultant glass.

Figure 3:
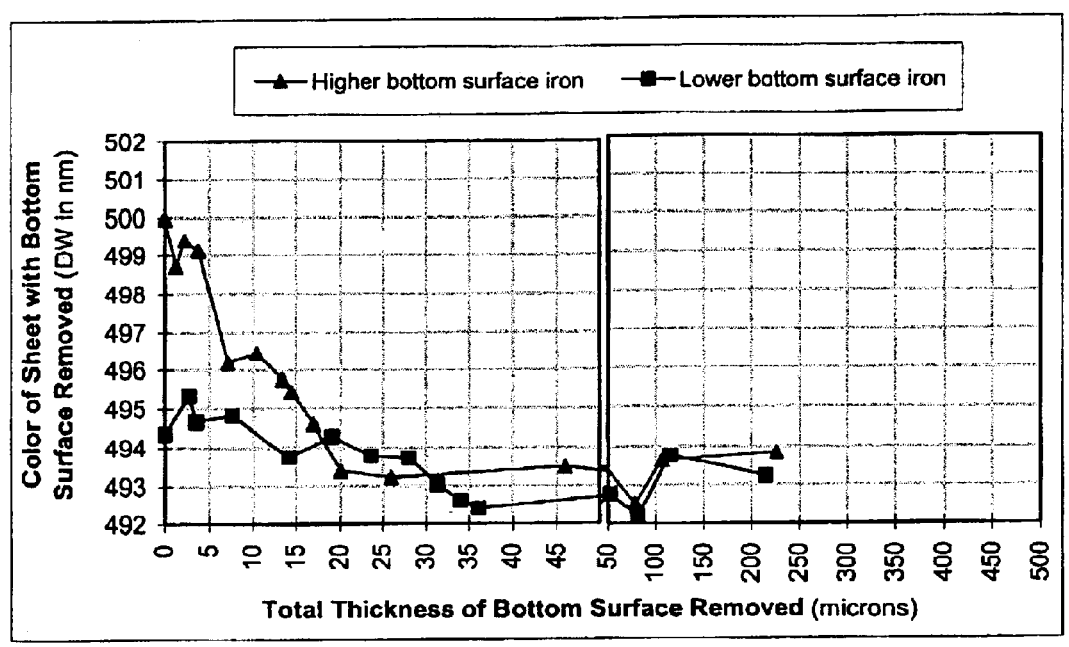
FIG. 3 is a graph of transmitted color (dominant wavelength) versus amount of bottom surface removed for two clear float glass sheets made in a conventional float process with differing amounts of iron diffused into the bottom surface of the glass.

FIG. 3 shows a graph of transmitted color (in terms of dominant wavelength) versus the amount of bottom surface removed for two clear glass samples made using a conventional float glass system having a non-vacuum float bath. Both of the compositions were the same except that Sample 4 (Higher Iron) was formed on a conventional molten tin bath having a higher iron content than the molten tin bath used for Sample 5 (Lower Iron). For Sample 4, the iron concentration in the molten tin was about 0.040 wt. % Fe. For Sample 5, the concentration of iron in the molten tin was about 0.013 wt. % Fe.

Table II shows selected properties for the two glass samples shown in FIG. 3.

TABLE II

|   | Sample 4 (Composition 1) Higher iron | Sample 5 (Composition 2) Lower iron |
|---|---|---|
| Thickness inches (cm) | 0.220 (0.56) | 0.224 (0.57) |
| $SiO_2$ | 72.94 | 72.92 |
| $Na_2O$ | 13.85 | 13.87 |
| $K_2O$ | 0.031 | 0.031 |
| CaO | 8.82 | 8.81 |
| MgO | 3.91 | 3.91 |
| $Al_2O_3$ | 0.10 | 0.10 |
| bulk sulfur ($SO_3$) | 0.235 | 0.237 |
| total bulk iron ($Fe_2O_3$) | 0.098 | 0.103 |
| iron redox ratio | 0.30 | 0.30 |
| bottom surface iron ($Fe_2O_3$) | 0.212 | 0.118 |
| [bulk sulfur] * [bottom surface iron] | 0.049 | 0.028 |

As shown in. FIG. 3, Sample 4 formed on the molten tin with the higher iron concentration appears to have more iron sulfide coloration than Sample 5, i.e., there was more amber color change characteristic of iron polysulfide when the bottom surface layer was removed from Sample 4. As with Example 1, the product of the concentrations of bulk sulfur and bottom surface iron corresponds to the relative change in dominant wavelength for Samples 4 and 5. However, in contrast to Example 1 where sulfur content was varied, the variable in this Example is iron in the molten tin.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A method of making clear glass having an azure edge coloration and low amber surface coloration in a non-vacuum float glass system, comprising:

providing a non-vacuum float glass system having a melter and a molten metal bath; and melting batch materials to provide a final glass product comprising:

| | |
|---|---|
| $SiO_2$ | 65–75 wt. %; |
| $Na_2O$ | 10–20 wt. %; |
| CaO | 5–15 wt .%; |
| MgO | 0–5 wt. %; |

-continued

| | |
|---|---|
| $Al_2O_3$ | 0–5 wt. %; |
| $K_2O$ | 0–5 wt. %; | and a colorant portion comprising:

| | |
|---|---|
| total iron ($Fe_2O_3$) | 0–0.02 wt. %; |
| CoO | 0–5 ppm; |
| $Nd_2O_3$ | 0–0.1 wt. %; and |
| CuO | 0–0.03 wt. %, | wherein the glass has a redox ratio in the range of 0.3 to 0.6, wherein the glass has a retained sulfur content of less than or equal to 0.11 wt. % $SO_3$, and wherein the batch materials comprise sodium sulfate and sodium nitrate, with the sodium sulfate present in an amount to provide a final glass product having less than or equal to 0.11 wt. % $SO_3$.

2. The method of claim 1, wherein the melter is an a air-fuel furnace having oxygen lances.

3. The method of claim 1, wherein the melter is an oxyfuel furnace.

4. The method of claim 1, wherein the batch materials further include a non-sulfur containing oxidizing agent.

5. The method of claim 4, wherein the oxidizing agent comprises at least one of sodium nitrate and cerium oxide.

6. The method of claim 1, wherein the redox ratio is in the range of 0.4 to 0.6.

7. The method of claim 1, wherein the retained sulfer is less than or equal to 0.1 wt. % $SO_3$.

8. The method of claim 1, wherein the retained sulfer is less than or equal to 0.08 wt. % $SO_3$.

9. The method of claim 1, wherein the retained sulfer is less than or equal to 0.05 wt. % $SO_3$.

10. The method of claim 1, wherein the total iron is in the range of 0.005 to 0.02 wt. %.

11. The method of claim 1, wherein the molten metal bath is essentially free of iron.

12. The method of claim 1, wherein the molten metal in the molten metal bath comprises less than or equal to 0.05 wt. % Fe.

13. The method of claim 1, wherein the molten metal in the molten metal bath comprises less than or equal to 0.01 wt. % Fe.

14. The method of claim 1, wherein the glass has a dominant wavelength in the range of 485 nm to 505 nm at a 5.5 mm equivalent thickness for glass sheets having a thickness in the range of 2 mm to 25 mm when viewed on edge.

15. A method of making clear glass in a non-vacuum float glass system, comprising:

providing a non-vacuum float class system having a melter and a molten metal bath; and melting batch materials to provide a final glass product comprising:

| | |
|---|---|
| $SiO_2$ | 65–75 wt. %; |
| $Na_2O$ | 10–20 wt. %; |
| CaO | 5–15 wt. %; |
| MgO | 0–5 wt. %; |
| $Al_2O_3$ | 0–5 wt. %; |
| $K_2O$ | 0–5 wt. %; | and a colorant portion comprising:

| | |
|---|---|
| total iron ($Fe_2O_3$) | 0–0.02 wt. %; |
| CoO | 0–5 ppm; |
| $Nd_2O_3$ | 0–0.1 wt. %; and |
| CuO | 0–0.03 wt. %, | wherein the glass has a redox ratio in the range of 0.3 to 0.6 and wherein the batch materials are essentially free of sulfur-containing materials.

16. The method of claim 15, wherein the redox ratio is in the range of 0.4 to 0.6.

17. The method of claim 15, wherein the total iron is in the range of 0.005 to 0.02 wt. %.

18. The method of claim 15, wherein the molten metal bath is essentially free of iron.

19. The method of claim 15, wherein the molten metal in the molten metal bath comprises less than or equal to 0.05 wt. % Fe.

20. A method of making clear glass having an azure edge coloration and low amber surface coloration in a non-vacuum float glass system, comprising:

providing a non-vacuum float glass system having a melter and a molten metal bath; and melting the batch materials to provide a final glass product comprising:

| | |
|---|---|
| $SiO_2$ | 65–75 wt. %; |
| $Na_2O$ | 10–20 wt. %; |
| CaO | 5–15 wt .%; |
| MgO | 0–5 wt. %; |
| $Al_2O_3$ | 0–5 wt. %; |
| $K_2O$ | 0–5 wt. %; |
| $CeO_2$ | greater than 0–0.2 wt. %; | and a colorant portion comprising:

| | |
|---|---|
| total iron ($Fe_2O_3$) | 0 wt. % to 0.02 wt. %; |
| CoO | 0–5 ppm; |
| $Nd_2O_3$ | 0–0.1 wt. %; |
| CuO | 0–0.03 wt. %, | wherein the glass has a redox ratio in the range of 0.3 to 0.6, wherein the glass has a retained sulfur content of less than or equal to 0.2 wt. % $SO_3$, wherein the batch materials comprise sodium sulfate and sodium nitrate, with the sodium sulfate present in an amount to provide a final glass product having less than or equal to 0.2 wt. % $SO_3$.

21. The method of claim 20, wherein the redox ratio is in the range of 0.4 to 0.6.

22. The method of claim 20, wherein the retained sulfur content is less than or equal to 0.15.

23. The method of claim 20, wherein the retained sulfur is less than or equal to 0.1 wt. % $SO_3$.

24. The method of claim 20, wherein the total iron is in the range of 0.005 to 0.02 wt. %.

25. The method of claim 20, wherein the molten metal bath is essentially free of iron.

26. The method of claim 20, wherein the glass has dominant wavelength in the range of 485 nm to 505 nm at a 5.5 mm equivalent thickness for glass sheets having a thickness in the range of 2 mm to 25 mm when viewed on edge.

27. A method of making clear glass in a non-vacuum float glass system, comprising:
    providing a non-vacuum float glass system having a melter and a molten metal bath;
    melting the batch materials to provide a final glass product comprising:

| | |
|---|---|
| $SiO_2$ | 65–75 wt. %; |
| $Na_2O$ | 10–20 wt. %; |
| CaO | 5–15 wt. %; |
| MgO | 0–5 wt. %; |
| $Al_2O_3$ | 0–5 wt. %; |
| $K_2O$ | 0–5 wt. %; |
| $CeO_2$ | greater than 0–0.2 wt. %; | and
a colorant portion comprising:

| | |
|---|---|
| total iron ($Fe_2O_3$) | 0.007 wt. % to 0.02 wt. %; |
| CoO | 0–5 ppm; |
| $Nd_2O_3$ | 0–0.1 wt. %; |
| CuO | 0–0.03 wt. %, | wherein the glass has a redox ratio in the range of 0.3 to 0.6, and
wherein the batch materials are essentially free of sulfur-containing materials.

28. A method of making clear glass having an azure edge coloration and low amber surface coloration in a non-vacuum float glass system, comprising:
    providing a non-vacuum float glass system having a melter and a molten metal bath;
    melting batch materials to provide a final glass product comprising:

| | |
|---|---|
| $SiO_2$ | 65–75 wt. %; |
| $Na_2O$ | 10–20 wt. %; |
| CaO | 5–15 wt. %; |
| MgO | 0–5 wt. %; |
| $Al_2O_3$ | 0–5 wt. %; |
| $K_2O$ | 0–5 wt. %; | and a colorant portion comprising:

| | |
|---|---|
| total iron (Fe2O3) | 0.007 wt. % to 0.02 wt. %; |
| CoO | 0–5 ppm; |
| Nd2O3 | 0–0.1 wt. %; and |
| CuO | 0–0.03 wt. %, | wherein the glass has a redox ratio in the range of 0.3 to 0.6, and
wherein the glass has a retained sulfur content of less than or equal to 0.11 wt. % $SO_3$;
further including treating the molten metal in the molten metal bath to remove dissolved iron such that the dissolved iron remaining in the molten metal is less than or equal to 0.05 wt. %.

29. The method of claim 28, including treating the molten metal such that the dissolved iron is less than or equal to 0.04 wt. %.

30. The method of claim 28, including treating the molten metal such that the dissolved iron is less than or equal to 0.03 wt. %.

31. The method of claim 28, including treating the molten metal such that the dissolved iron is less than or equal to 0.02 wt. %.

32. The method of claim 28, including treating the molten metal such that the dissolved iron is less than or equal to 0.01 wt. %.

* * * * *